(12) United States Patent
White et al.

(10) Patent No.: US 9,206,609 B2
(45) Date of Patent: Dec. 8, 2015

(54) THERMAL BREAK WALL SYSTEMS AND THERMAL ADJUSTABLE CLIP

(71) Applicants: Donald George White, Victoria (CA); Lorrel Kathleen White, Victoria (CA); Daniel Murray White, Victoria (CA)

(72) Inventors: Donald George White, Victoria (CA); Lorrel Kathleen White, Victoria (CA); Daniel Murray White, Victoria (CA)

(*) Notice: Subject to any disclaimer, the term of this patent is extended or adjusted under 35 U.S.C. 154(b) by 0 days.

(21) Appl. No.: 14/267,219

(22) Filed: May 1, 2014

(65) Prior Publication Data
US 2014/0325928 A1   Nov. 6, 2014

Related U.S. Application Data

(60) Provisional application No. 61/818,802, filed on May 2, 2013.

(51) Int. Cl.
  *E04F 13/08* (2006.01)
  *F25D 23/08* (2006.01)
  *E04B 1/74* (2006.01)
  *E04B 1/78* (2006.01)

(52) U.S. Cl.
  CPC .......... *E04F 13/0805* (2013.01); *F25D 23/085* (2013.01); *E04B 1/78* (2013.01); *E04B 2001/742* (2013.01); *Y10T 428/233* (2015.01)

(58) Field of Classification Search
  CPC ....... F25D 23/085; E04B 1/74; E04B 1/7608; E04B 2/02; E04B 2/06; E04B 2001/742; E04B 2002/0243; E04B 1/78; E04F 13/0805; Y10T 428/233

USPC .............. 52/717.02, 717.01, 506.05, 506.04, 52/506.06, 506.08, 709, 481.1, 481.2, 52/483.1, DIG. 5
See application file for complete search history.

(56) References Cited

U.S. PATENT DOCUMENTS

| | | | | |
|---|---|---|---|---|
| 4,442,647 A * | 4/1984 | Olsen | | 52/393 |
| 6,122,883 A * | 9/2000 | Braun | | 52/717.01 |
| 7,647,744 B2 * | 1/2010 | Payne, Jr. | | 52/770 |
| 7,926,230 B2 * | 4/2011 | Yoshida et al. | | 52/235 |
| 2004/0010998 A1 * | 1/2004 | Turco | | 52/762 |
| 2005/0100728 A1 * | 5/2005 | Ristic-Lehmann et al. | | 428/323 |
| 2008/0008345 A1 * | 1/2008 | Donaldson | | 381/386 |
| 2008/0176020 A1 * | 7/2008 | Heng et al. | | 428/49 |
| 2009/0049781 A1 * | 2/2009 | Pilz et al. | | 52/481.1 |
| 2009/0283359 A1 * | 11/2009 | Ravnaas | | 181/286 |
| 2013/0186020 A1 * | 7/2013 | Pilz | | 52/232 |
| 2014/0026510 A1 * | 1/2014 | Kubassek et al. | | 52/512 |

FOREIGN PATENT DOCUMENTS

JP      02144437 A *  6/1990  ............... E04B 2/56

* cited by examiner

*Primary Examiner* — Robert Canfield
*Assistant Examiner* — Babajide Demuren
(74) *Attorney, Agent, or Firm* — Tomlinson Rust McKinstr Grable

(57) ABSTRACT

Exterior wall systems, cladding for same and components of such systems, including an adjustable clip for use in mounting cladding and a thermal block comprising a silica aerogel material.

12 Claims, 7 Drawing Sheets

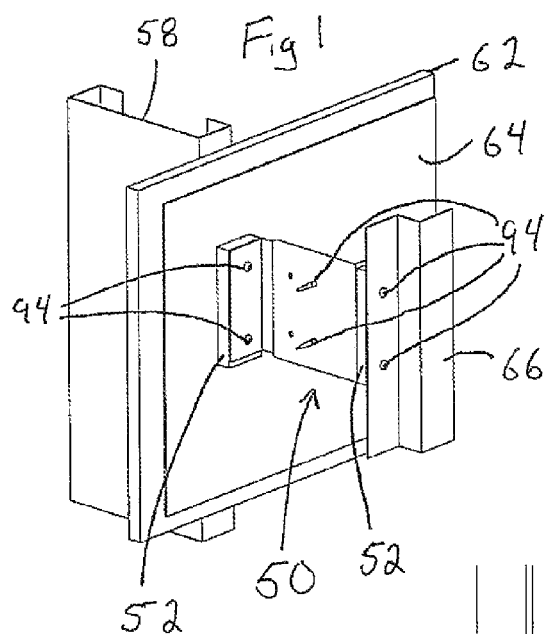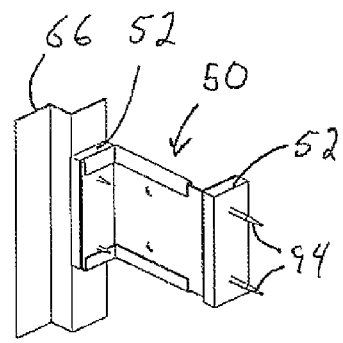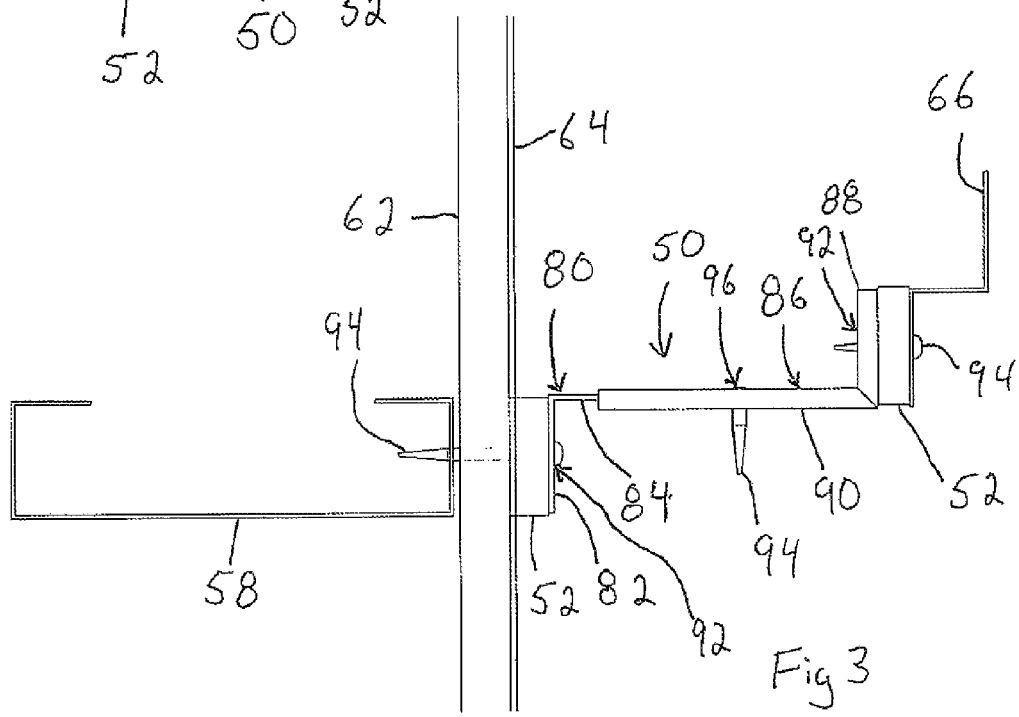

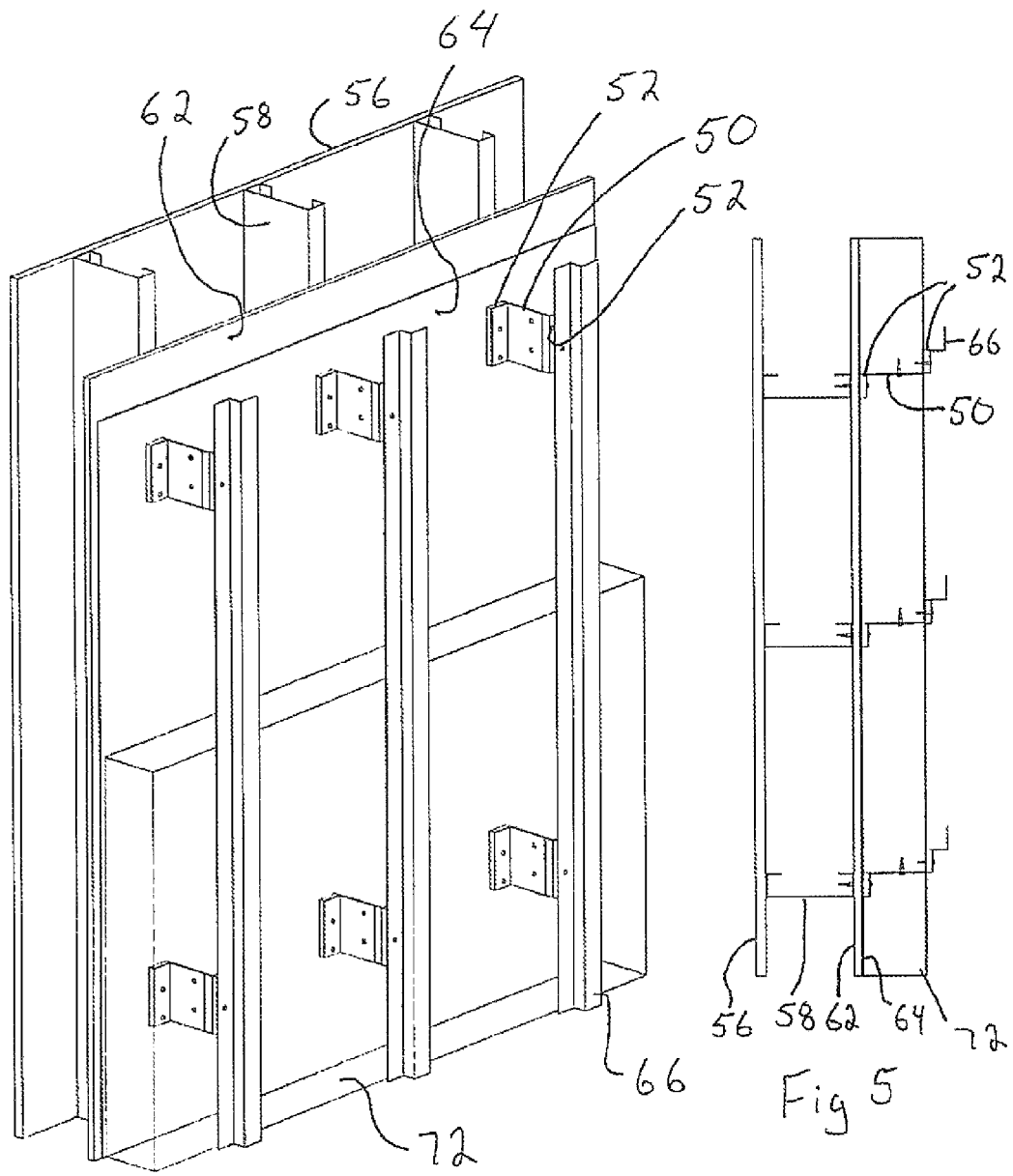

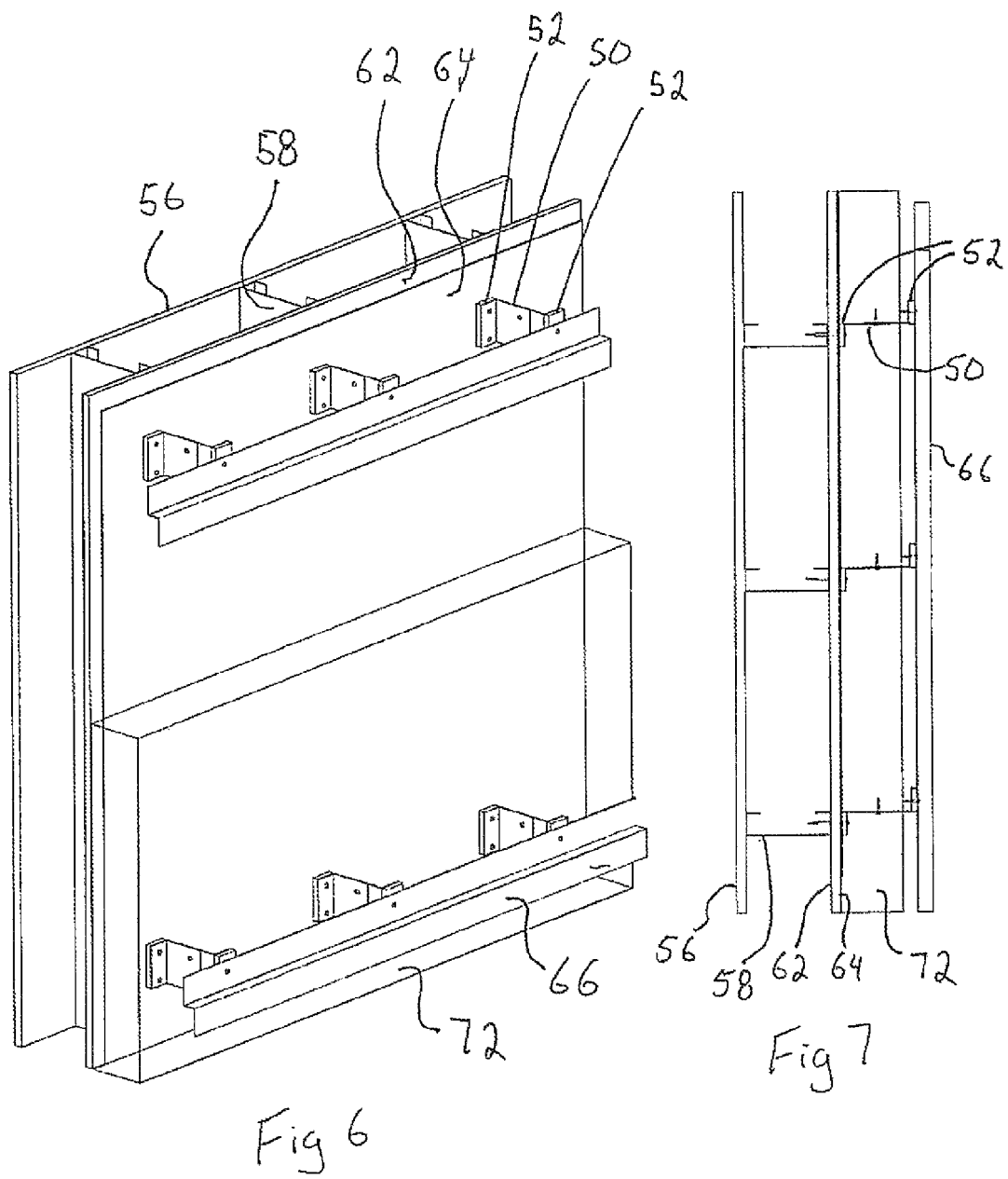

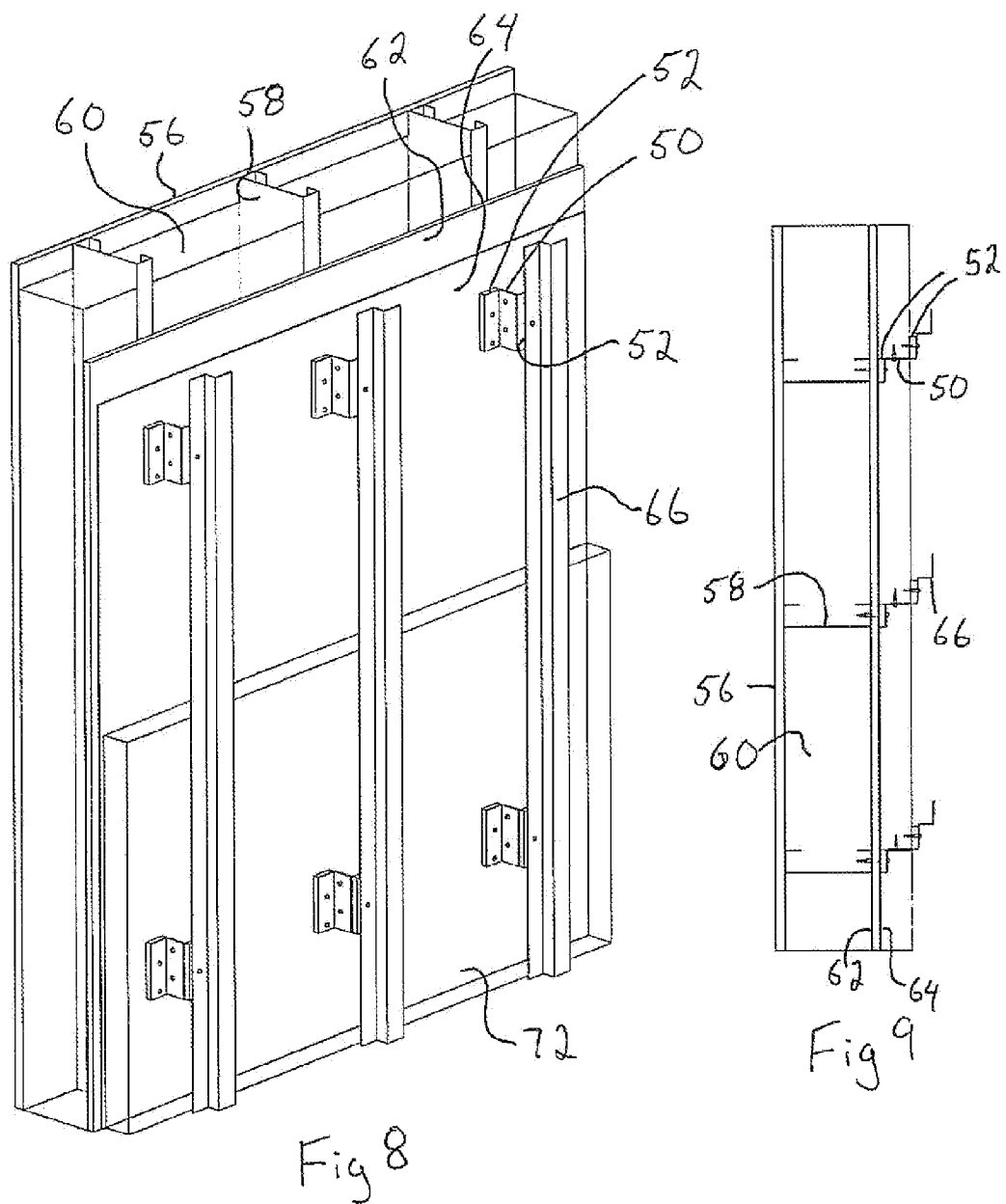

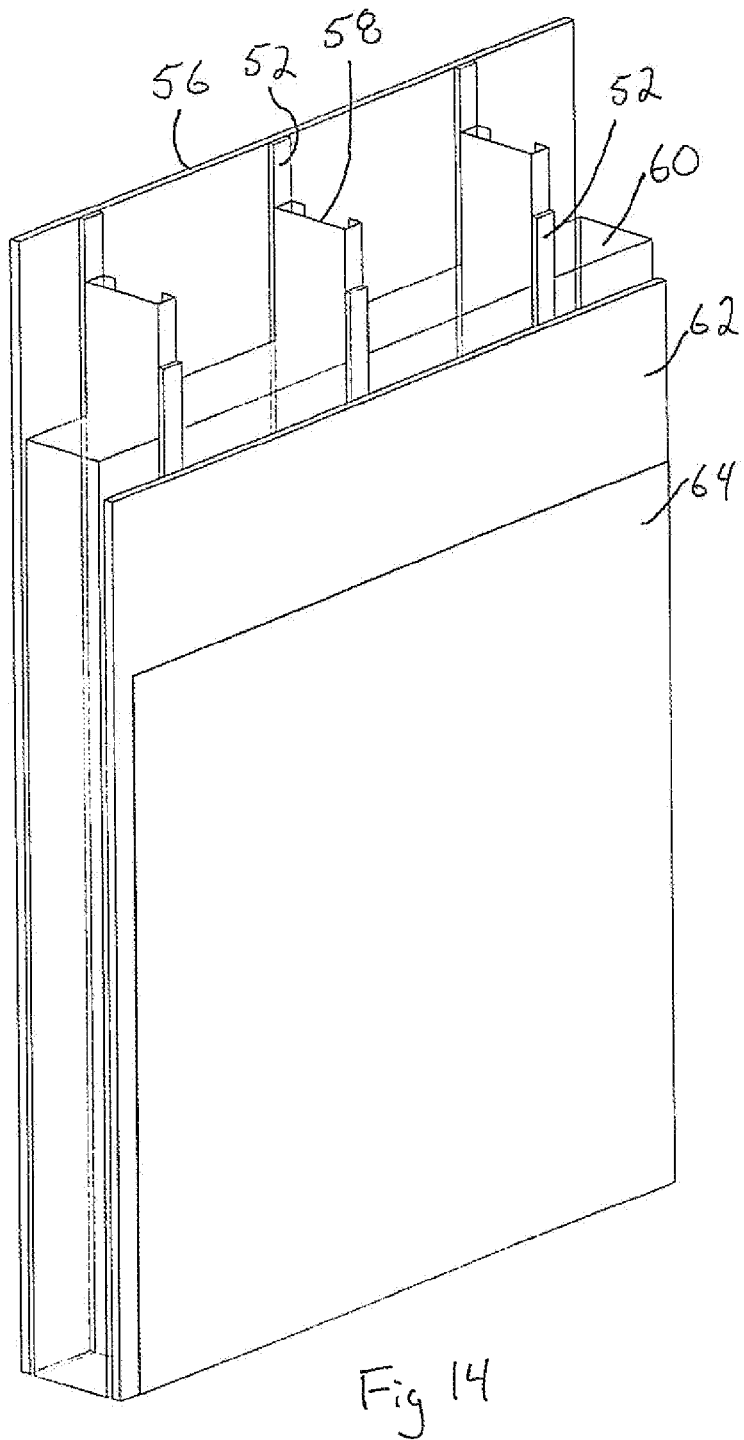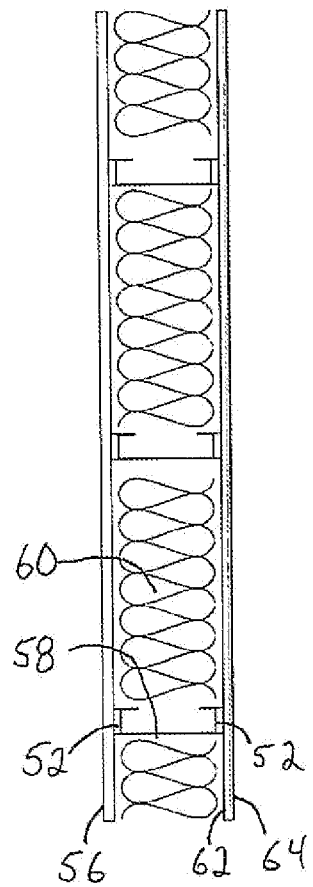
Fig 14
Fig 15

THERMAL BREAK WALL SYSTEMS AND THERMAL ADJUSTABLE CLIP

CROSS REFERENCE TO RELATED APPLICATION

This application claims the benefit of U.S. Provisional Patent Application No. 61/818,802, filed 2 May 2013, the entire contents of which are incorporated herein by reference.

FIELD

The present invention relates to the field of wall systems, primarily exterior walls, systems for cladding same and components of such systems.

BACKGROUND

Modern buildings are generally required to satisfy stringent and evolving energy efficiency and insulation standards. For example, jurisdictions throughout North America are imposing building requirements directed to insulation values. For example, the ASHRAE 90.1 2010 Requirements for British Columbia, as per the BC Building Code. To meet the requirements of ASHRAE 90.1 2010 in British Columbia, the wall assembly must satisfy three criteria: an overall U-factor of not more than 0.064 BTU/(hr-ft2-oF); a minimum level of insulation equivalent to R13 (conventionally satisfied by 6" of glass-fibre batt insulation, or by nominal 4" batt insulation plus 1½" of semi-rigid mineral-wool insulation); and a minimum of R7.5 continuous insulation.

SUMMARY

In one aspect the present invention provides a cladding mounting assembly for use in a wall system, the cladding mounting assembly including: an adjustable clip comprising: a first component having a first component mounting means and a projecting web; and a second component having a second component mounting means and a web receiver for mating slidable engagement with the web; and a fixing means for fixing the web in a desired position in mating engagement with the web receiver; and a thermal block for interposing between the adjustable clip and adjacent components of the wall system.

The web may be generally planar and may have opposed substantially parallel web edges; and the web receiver may have opposed substantially parallel channels for receiving the web edges. The second component may comprise sheet metal and the channels may be provided by bends in the sheet metal.

The fixing means may comprise holes in the web or the web receiver for use in inserting fasteners through both the web and the web receiver to fix one to the other. The fixing means may comprise aligned holes in the web and the web receiver for use in inserting fasteners through both the web and the web receiver to fix one to the other in predetermined relative positions.

The first component mounting means and the second component mounting means may each comprise a planar member having at least one hole for receiving a fastener.

The first component and second component may be made from sheet metal. The sheet metal may be stainless steel. The sheet metal may be galvanized steel.

The thermal block may include an insulation material, an encapsulant and an adhesive material.

The insulation material may include a silica aerogel material. The insulation material may be a fibrous insulation embedded with a silica aerogel. The insulation material may be PROLOFT™. The insulation material may be about 10 mm thick or about 20 mm thick.

The encapsulant may be a shrink wrap plastic. The adhesive may be a double-sided bonding tape.

In another aspect, the present invention provides an adjustable clip for use with a thermal block in a wall system, the adjustable clip including: a first component made from sheet metal and having: a first component mounting means having at least one hole for receiving a fastener, and a projecting web having opposed substantially parallel web edges, a second component made from sheet metal and having: a second component mounting means having at least one hole for receiving a fastener; and a web receiver having opposed substantially parallel channels for receiving the web edges in mating slidable engagement; and a fixing means for fixing the web in a desired position in mating engagement with the web receiver, being holes in the web or the web receiver for use in inserting fasteners through both the web and the web receiver to fix one to the other.

The sheet metal may be stainless steel.

In another aspect, the present invention provides a thermal block for use in a wall system, the thermal block including: an insulation material comprising a silica aerogel material; an encapsulant comprising a shrink wrap plastic; and an adhesive material comprising a double-sided bonding tape.

The insulation material may be PROLOFT™ and may be about 10 mm thick or about 20 mm thick.

SUMMARY OF THE DRAWINGS

FIG. 1 is an isolation perspective view of a building wall system showing an adjustable clip and thermal block embodiment of the present invention in use with a vertical small Z bar.

FIG. 2 is an isolation perspective view showing the adjustable clip embodiment of FIG. 1, with, as compared to FIG. 1, inner portions of the building wall system removed.

FIG. 3 is a top plan, quasi-sectional, partially transparent representation of the building wall system shown in FIG. 1.

FIG. 4 is a perspective, schematic, partially transparent representation of the building wall system shown in FIG. 1.

FIG. 5 is a top plan, quasi-sectional, partially transparent representation of the building wall system shown in FIG. 4.

FIG. 6 is a perspective, schematic, partially transparent view of a building wall system showing an adjustable clip and thermal block embodiment of the present invention in use with a horizontal small Z bar.

FIG. 7 is a top plan, quasi-sectional, partially transparent representation of the building wall system shown in FIG. 6.

FIG. 8 is a perspective, schematic, partially transparent view of a building wall system showing an adjustable clip and thermal block embodiment of the present invention in use with a vertical small Z bar.

FIG. 9 is a top plan, quasi-sectional, partially transparent representation of the building wall system shown in FIG. 8.

FIG. 14 is a perspective, schematic, partially transparent view of a building wall system showing a thermal block embodiment of the present invention interposed between wall studs and sheathing, and between the wall studs and the interior finish.

FIG. 15 is a top plan, quasi-sectional, partially transparent representation of the building wall system shown in FIG. 14.

DETAILED DESCRIPTION WITH REFERENCE TO THE DRAWINGS

Figure 10:
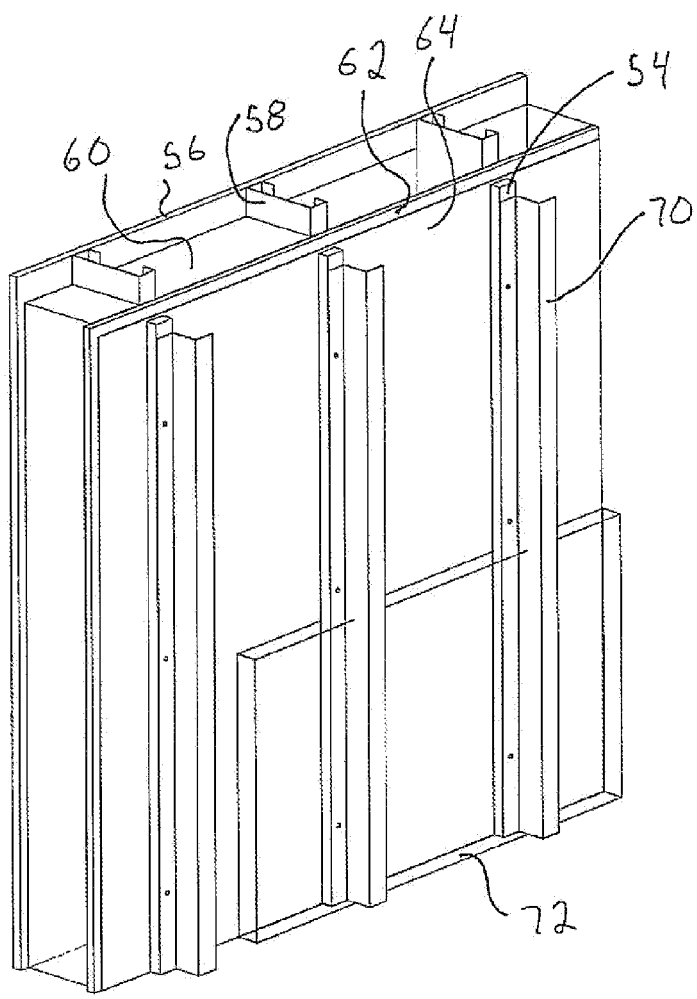
FIG. 10 is a perspective, schematic, partially transparent view of a building wall system showing a thermal block embodiment of the present invention in use with a vertical large Z bar.

As shown in the drawings, embodiments of the present invention include systems and components for use in exterior walls and the cladding for exterior walls.

As shown in the drawings, exterior wall systems comprising embodiments of the present invention include an adjustable clip 50, and small thermal blocks 52 and large thermal blocks 54 in use with exterior wall components, including an interior finish 56 (e.g., 15 mm (⅝") gypsum wall board); wall studs 58 (typically, metal studs, 140 mm (6") 18 ga on 406 mm (16") centers), inter-stud insulation 60 (e.g., R20 fibreglass insulation); sheathing 62 (typically, ½" plywood, oriented strand board or equivalent); an air/vapour barrier membrane 64 (eg. SOPRASEAL™); galvanized metal Z bar, being, in the examples shown in the drawings, small Z bar 66 (18 ga, 38 mm×25 mm×38 mm (1½"×1"×1½")), medium Z bar 68 (18 ga, 38 mm×51 mm×38 mm (1½"×2"×1½")) and large Z bar 70 (18 ga, 38 mm×75 mm×38 mm (1½"×3"×1½")); and cladding insulation 72 (e.g., stone wool, e.g., ROXUL™).

The adjustable clip 50 is made from sheet metal, preferably stainless steel or galvanized steel. The adjustable clip 50 comprises two matingly engageable components, an L bracket 80, having an L-bracket mounting plate 82 and a projecting web 84, and a sleeved L bracket 86, having a sleeved-L-bracket mounting plate 88 and a sleeve 90 for receiving the web 84.

The sleeve 90 is partially open and is defined by opposed peripheral portions of the sheet metal from which the sleeved L bracket 86 is made, defined by opposed parallel bends made in such a way that the opposed peripheral portions overly adjacent portions of the sheet metal, with the bends located and configured so as to provide sufficient space to receive the web 84 between the opposed bends. As shown in the drawings, the sleeved L bracket 86 is preferably made by making the bends defining the sleeve 90 prior to making the bend between the sleeved-L-bracket mounting plate 88 and the sleeve 90, and having the bends defining the sleeve 90 extend into the sheet metal comprising the sleeved-L-bracket mounting plate 88 so that the peripheral overlying portions extend to and stiffen the sleeved-L-bracket mounting plate 88 in the completed sleeved L bracket 86.

In the embodiments shown in the drawings, the L bracket 80 is made from 18ga stainless steel and the sleeved L bracket 86 is made from 16ga stainless steel.

The L-bracket mounting plate 82 and sleeved-L-bracket mounting plate 88 have pre-formed mounting holes 92 for receiving fasteners (in the drawings, being screws 94).

The web 84 and sleeve 90 have aligned pre-formed adjustment holes 96, for use in affixing the web 84 to the sleeve 90 with screws 94, at predetermined positions corresponding to standard desired spacings between the L-bracket mounting plate 82 and sleeved-L-bracket mounting plate 88.

The adjustable clip 50 enables installers to adjust the size of the installed adjustable clip 50 to accommodate differences in vertical walls or soffits. The adjustable clip 50 gives the installers the control to adjust for imperfections in buildings, such as new buildings with concrete walls or steel-stud walls that are not on the same vertical plane as the slab beams; or in renovated buildings with concrete, brick and steel studs that are non-parallel or otherwise inconsistent with each other.

A desirable range of spacings between the L-bracket mounting plate 82 and sleeved-L-bracket mounting plate 88 can be achieved by providing the sleeved L bracket 86 in two or more sizes. Spacings between the L-bracket mounting plate 82 and sleeved L-bracket mounting plate 88, of from two (2) inches to six (6) inches can be achieved with two sizes of sleeved L brackets 86.

The small thermal block 52 and large thermal block 54 each comprises a high-performance semi-rigid insulation material, an encapsulant and an adhesive material.

The high-performance semi-rigid insulation material is a silica aerogel material or insulation material containing silica aerogel materials (for example, fibrous insulation embedded with aerogel), including PROLOFT™ and SPACELOFT™ as produced and sold by Aspen Aerogels, Inc. An aerogel is a synthetic porous material derived from a gel, in which the liquid component of the gel has been replaced with a gas, resulting in a solid with low density and low thermal conductivity. Silica aerogel is the most common type of aerogel. It is silica-based, derived from silica gel. Silica aerogel has low thermal conductivity and thus has desirable thermal insulative properties.

The encapsulant is preferably a shrink wrap plastic. Alternatively, the high-performance insulation material may be encapsulated/sealed with a spray coating of a suitable material (e.g., a mixture of Weldbond™ Glue and water at a ratio of 6 parts water to 1 part glue).

The adhesive is preferably a section of double-sided tape (e.g., a 3M™ double-sided bonding tape). The double-sided tape is affixed to a side of the encapsulated high-performance insulation material to enable the user to secure the encapsulated high-performance insulation material in position during installation (i.e., by peeling back the tape cover and affixing the encapsulated high-performance insulation material to the relevant component).

In the embodiments shown in the drawings and described in what follows, the high-performance insulation material is PROLOFT™, the encapsulant is shrink wrap plastic and the adhesive material is 3M™ double-sided bonding tape; and the small thermal block 52 is 10 mm (⅜") thick and the large thermal block 54 is 20 mm (¾") thick.

FIGS. 1 through 5 show a building wall system having adjustable clips 50 (the adjustable clips on centers spaced relative to one another about 406 mm (16") in a horizontal dimension and about 914 mm (36") in a vertical dimension) and small thermal blocks 52 in use with vertical small Z bars 66 and cladding insulation 72 (being, ROXUL™ insulation 102 mm (4") R 16.8). The wall system shown in FIGS. 1 to 5 is at times referred to herein as Wall System #1.

FIGS. 6 and 7 show a building wall system having adjustable clips 50 (the adjustable clips on centers spaced relative to one another about 406 mm (16") in a horizontal dimension and about 914 mm (36") in a vertical dimension) and small thermal blocks 52 in use with vertical small Z bar 66 and cladding insulation 72 (being, ROXUL™ insulation 102 mm (4") R 16.8). The wall system shown in FIGS. 6 and 7 is at times referred to herein as Wall System #2.

FIGS. 8 and 9 show a building wall system having adjustable clips 50 (the adjustable clips on centers spaced relative to one another about 406 mm (16") in a horizontal dimension and about 914 mm (36") in a vertical dimension) and small thermal blocks 52 in use with horizontal small Z bar 66, and cladding insulation 72 (being, ROXUL™ insulation 51 mm (2") R 8.4), and inter-stud insulation 60 (being, R 20 insulation). The wall system shown in FIGS. 8 and 9 is at times referred to herein as Wall System #3.

Figure 11:
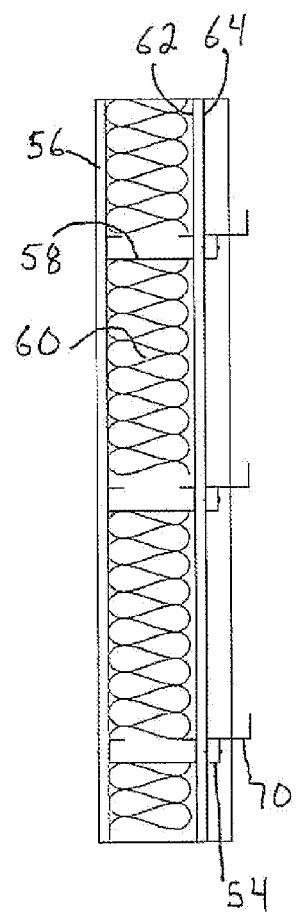
FIG. 11 is a top plan, quasi-sectional, partially transparent representation of the building all system shown in FIG. 10.

FIGS. 10 and 11 show a building wall system having large thermal blocks 54 in use with vertical large Z bar 70, and cladding insulation 72 (being, ROXUL™ insulation 51 mm (2") R 8.4), and inter-stud insulation 60 (being, R 20 insulation). The wall system shown in FIGS. 10 and 11 is at times referred to herein as Wall System #4.

Figures 12, 13:
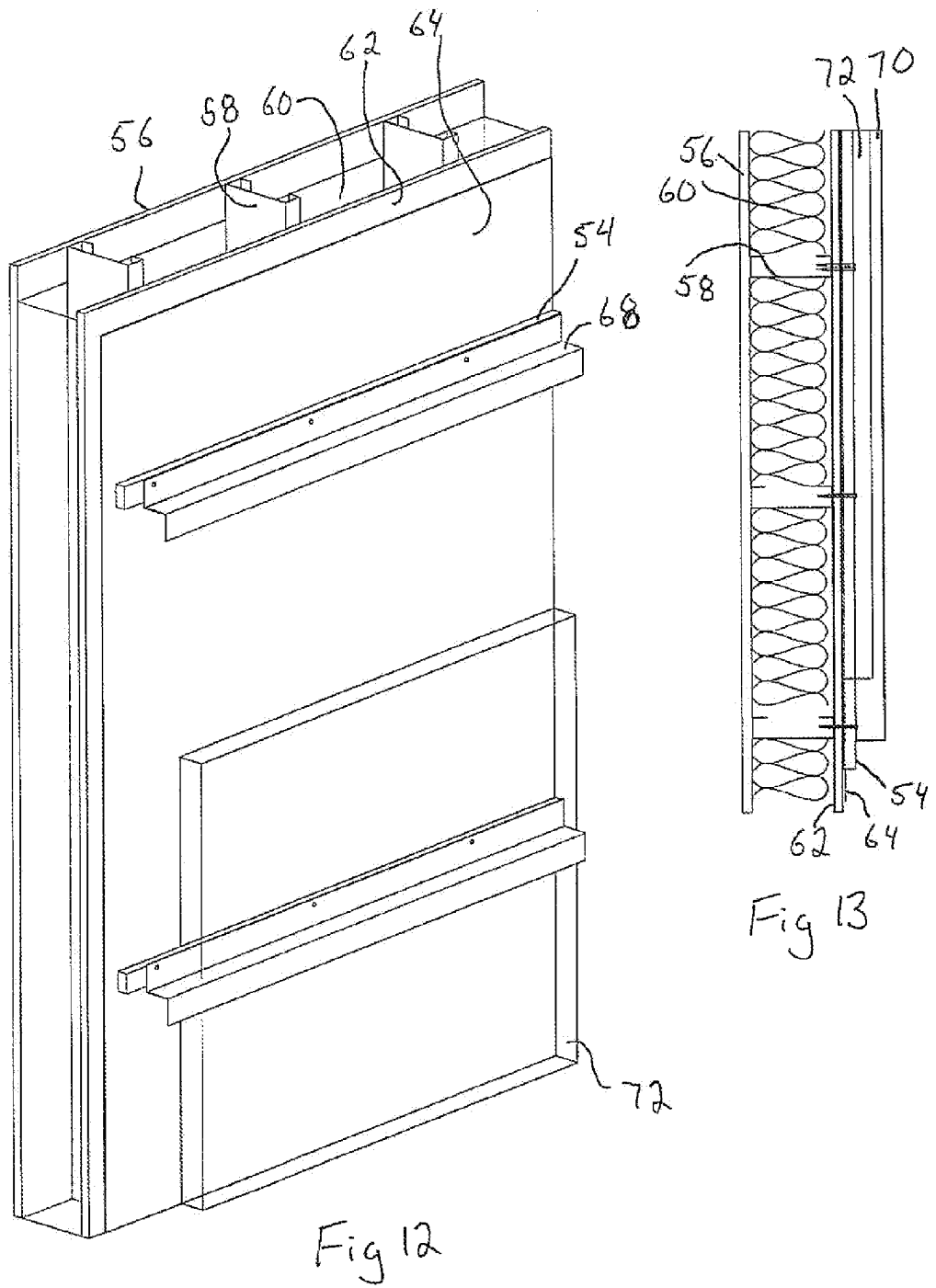
FIG. 12 is a perspective, schematic, partially transparent view of a building wall system showing a thermal block embodiment of the present invention in use with a horizontal medium Z bar.
FIG. 13 is a top plan, quasi-sectional, partially transparent representation of the building wall system shown in FIG. 12.

FIGS. 12 and 13 show a building wall system having large thermal blocks 54 in use with vertical large Z bar 70, and cladding insulation 72 (being, ROXUL™ insulation 51 mm (2") R 8.4), and inter-stud insulation 60 (being, R 20 insulation). The wall system shown in FIGS. 12 and 13 is at times referred to herein as Wall System #5.

FIGS. 14 and 15 show a building wall system having small thermal blocks 52 interposed between wall studs 58 and sheathing 62, and between the wall studs 58 and the interior finish 56, and in use with inter-stud insulation 60 (being, R 20 insulation). The wall system shown in FIGS. 14 and 15 is at times referred to herein as Wall System #6.

Structural Concept and Data

Gravity loading creates a rotational force (moment) in each installed adjustable clip 50; this force is proportional to the installed adjustable clip 50 length, as well as the cladding weight, and is resisted primarily by a force couple between the upper mounting screw 94 and the lower compression region of the adjustable clip 50. The small thermal block 52 between the adjustable clip 50 and the structure is a semi-rigid material. In use, the overall system installation should be limited by a permissible compressive stress applied to the small thermal block 52 thus limiting tip deflection of the adjustable clips 50, and deflection in the overall cladding system. Limiting compressive stress to 15 psi (2160 psf) in the compression region of the small thermal block 52 results in a reasonable 0.0572" estimated strain, or less than one degree of rotation in a typical application.

The adjustable clips 50 are used with fasteners configured to resist the cladding system self-weight in combination with wind suction; wind suction typically governs over seismic force levels. Seismic ductility requirements and connection requirements of the governing Building Code must be observed. For example, the 2012 British Columbia Building Code, Sentence 4.1.8.18 8) d) does not permit power-actuated fasteners or drop-in anchors for tension loads, and thus these fasteners would typically not be permitted for fastening the adjustable clips to a concrete or structural steel support structure.

Fastener Data

Light Gauge Metal Framing:

| Leland Master Driller - #12-14 #3 Fastener, DT2000 | | | |
|---|---|---|---|
| Stud Gauge | 20 | 18 | 16 |
| Nominal Member Thickness (in) | 0.0346 | 0.0451 | 0.0566 |
| Tensile Capacity (lbs) | 386 | 554 | 760 |
| Allowable Tensile (lbs) | 96.5 | 138.5 | 190.0 |
| Ultimate Shear (lbs) | 772 | 1361 | 1623 |
| Allowable Shear (lbs) | 193.0 | 340.3 | 405.8 |

Note -
Factor of Safety (FS) for Table Allowable Values FS = 4

Concrete Support:

| ITW Buildex Tapcon Screw - ¼" 1¾" embedment | | | |
|---|---|---|---|
| Concrete Strength (psi) | 2000 | 4000 | 5000 |
| Tensile Capacity (lbs) | 2020 | 2380 | 2770 |
| Allowable Tension (lbs) | 505 | 595 | 692.5 |
| Shear Capacity (lbs) | 1670 | 1670 | 1670 |
| Allowable Shear (lbs) | 417.5 | 417.5 | 417.5 |

Note -
Factor of Safety (FS) for Table Allowable Values FS = 4

Max. Tributary Z-Clip Area (sqft) for Deadload/Clip Length, Limiting PROLOFT™ Compression to 15 psi:

| | Cladding Weight (psf) | | | | | | |
|---|---|---|---|---|---|---|---|
| Overall Clip Length | 4 | 5 | 6 | 7 | 8 | 9 | 10 |
| 1.5 | 2.67 | 2.67 | 2.67 | 2.67 | 2.67 | 2.67 | 2.67 |
| 2 | 2.67 | 2.67 | 2.67 | 2.67 | 2.67 | 2.67 | 2.67 |
| 2.5 | 2.67 | 2.67 | 2.67 | 2.67 | 2.67 | 2.67 | 2.67 |
| 3 | 2.67 | 2.67 | 2.67 | 2.67 | 2.67 | 2.51 | 2.26 |
| 3.5 | 2.67 | 2.67 | 2.67 | 2.67 | 2.42 | 2.15 | 1.94 |
| 4 | 2.67 | 2.67 | 2.67 | 2.42 | 2.12 | 1.88 | 1.70 |
| 4.5 | 2.67 | 2.67 | 2.51 | 2.15 | 1.88 | 1.68 | 1.51 |
| 5 | 2.67 | 2.67 | 2.26 | 1.94 | 1.70 | 1.51 | 1.36 |
| 5.5 | 2.67 | 2.47 | 2.06 | 1.76 | 1.54 | 1.37 | 1.23 |
| 6 | 2.67 | 2.26 | 1.88 | 1.62 | 1.41 | 1.26 | 1.13 |

Thermal Performance Data
Results of FRAMEplus Models for All Sections and Wall Types

| Wall System # | Overall "U" | | Overall "R" | |
|---|---|---|---|---|
| | W/ (m²-° C.) | BTU/ (hr-ft²-° F.) | (m²-° C.)/ W | (hr-ft²-° F.)/ BTU |
| 1/2 | 0.33 | 0.058 | 3.03 | 17.2 |
| 3 | 0.33 | 0.053 | 3.30 | 18.7 |
| 4 | 0.30 | 0.053 | 3.32 | 18.9 |
| 5 | 0.34 | 0.060 | 2.94 | 16.7 |
| 6 | 0.32 | 0.056 | 3.15 | 17.9 |

The U-factors and R-values shown here were calculated assuming that the studs, clips and vertical Z bars shown in the figures are spaced at 16" on centre. Horizontal Z bars in Wall System #5 were also assumed to be spaced at 16" on centre vertically, as this provides a conservative result (larger vertical spacing would result in a slight improvement in the thermal resistance of the assembly). These calculations do not include head or sill tracks, nor do they account for seismic bracing or penetrations due to mechanical or electrical services.

What is claimed is:

1. A cladding mounting assembly for use in a wall system, the cladding mounting assembly comprising:
   an adjustable clip comprising:
   a first component having a first component mounting means and a projecting web; and
   a second component having a second component mounting means and a web receiver for mating slidable engagement with the web; and
   a fixing means for fixing the web in a desired position in mating engagement with the web receiver;
   a thermal block for interposing between the adjustable clip and adjacent components of the wall system;

wherein the thermal block comprises an insulation material, an encapsulant and an adhesive material;
wherein the insulation material comprises a silica aerogel material;
wherein the insulation material comprises a fibrous insulation embedded with a silica aerogel.

2. The cladding mounting assembly of claim 1, wherein:
the web is generally planar and has opposed substantially parallel web edges; and
the web receiver has opposed substantially parallel channels for receiving the web edges.

3. The cladding mounting assembly of claim 2, wherein the second component comprises sheet metal and the channels are provided by bends in the sheet metal.

4. The cladding mounting assembly of claim 2, wherein the fixing means comprises holes in the web or the web receiver for use in inserting fasteners through both the web and the web receiver to fix one to the other.

5. The cladding mounting assembly of claim 2, wherein the fixing means comprises aligned holes in the web and the web receiver for use in inserting fasteners through both the web and the web receiver to fix one to the other in pre-determined relative positions.

6. The cladding mounting assembly of claim 1, wherein the first component mounting means and the second component mounting means each comprise a planar member having at least one hole for receiving a fastener.

7. The cladding mounting assembly of claim 1, wherein the first component and second component are made from sheet metal.

8. The cladding mounting assembly of claim 7, wherein the sheet metal is stainless steel.

9. The cladding mounting assembly of claim 8, wherein the sheet metal is galvanized steel.

10. The cladding mounting assembly of claim 1, wherein the insulation material is about 10 mm thick or about 20 mm thick.

11. The cladding mounting assembly of claim 1, wherein the encapsulant comprises a shrink wrap plastic.

12. The cladding mounting assembly of claim 1, wherein the adhesive comprises a double-sided bonding tape.

* * * * *